A. F. POOLE.
SPEEDOMETER.
APPLICATION FILED SEPT. 18, 1915. RENEWED APR. 23, 1917.
1,249,189.
Patented Dec. 4, 1917.
3 SHEETS—SHEET 1.
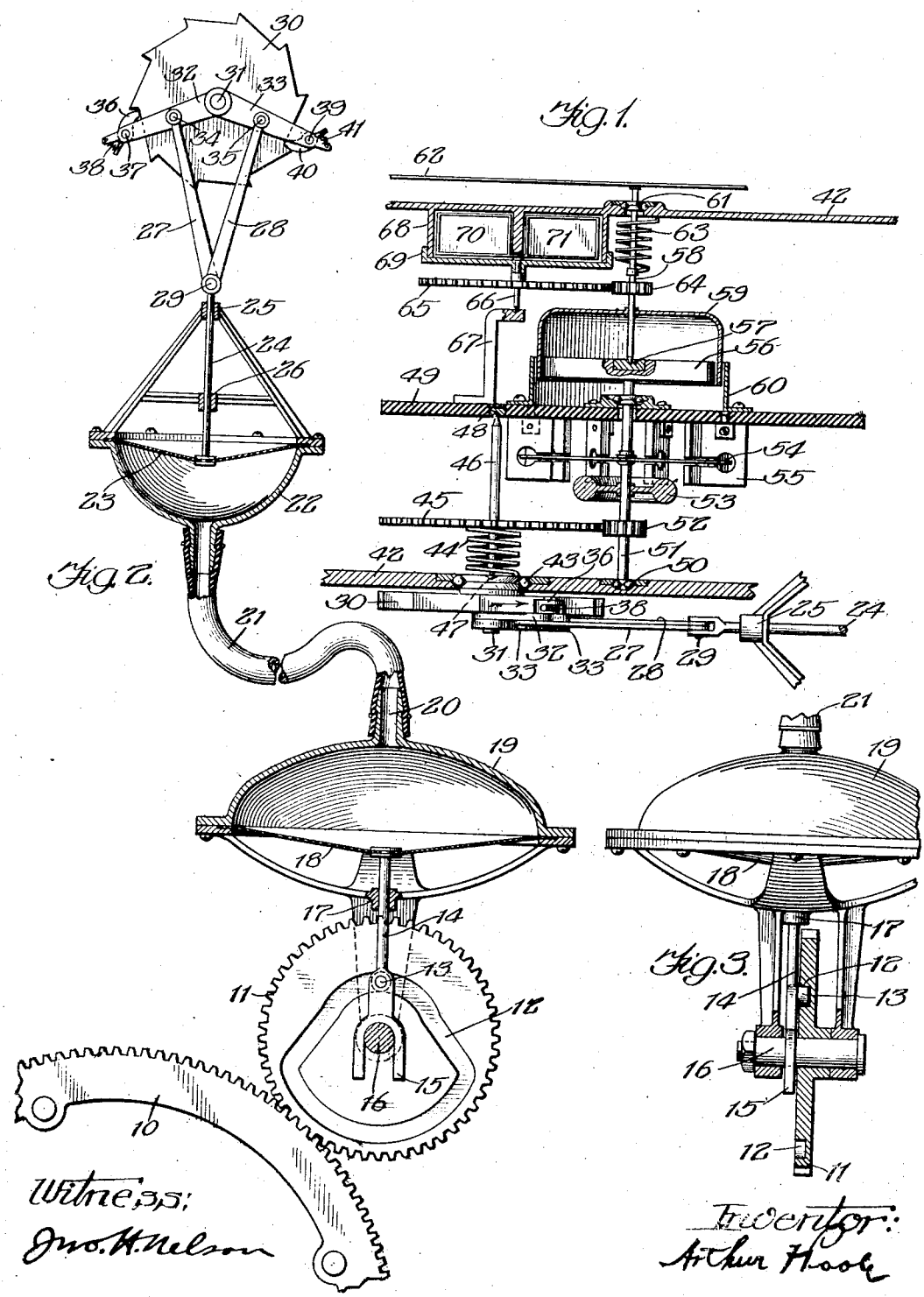

A. F. POOLE.
SPEEDOMETER.
APPLICATION FILED SEPT. 18, 1915. RENEWED APR. 23, 1917.
1,249,189.
Patented Dec. 4, 1917.
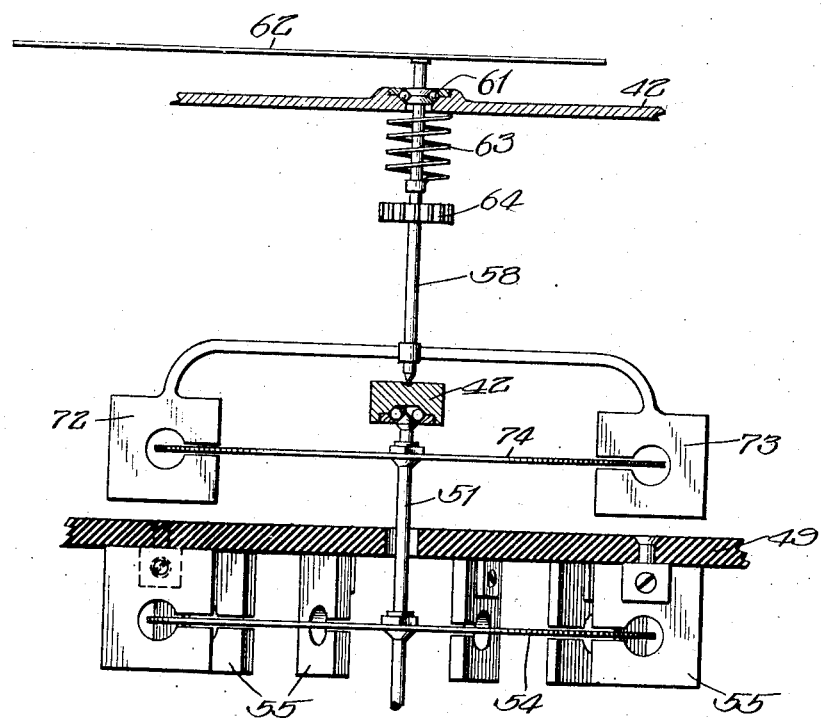
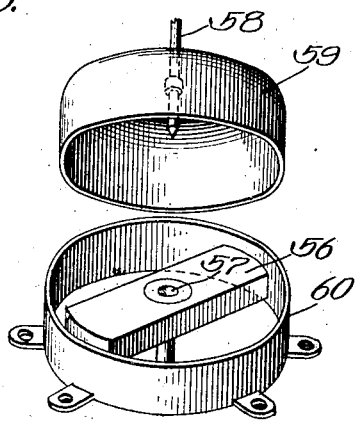

A. F. POOLE.
SPEEDOMETER.
APPLICATION FILED SEPT. 18, 1915. RENEWED APR. 23, 1917.
1,249,189.
Patented Dec. 4, 1917.
3 SHEETS—SHEET 3.
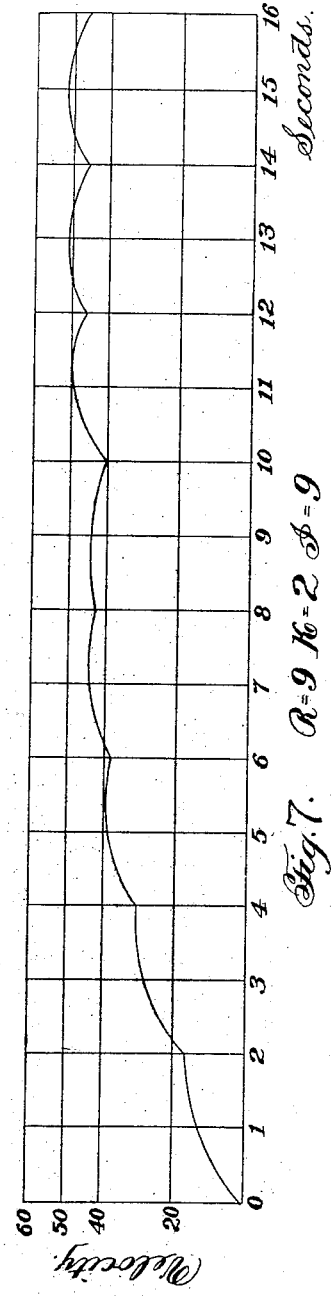
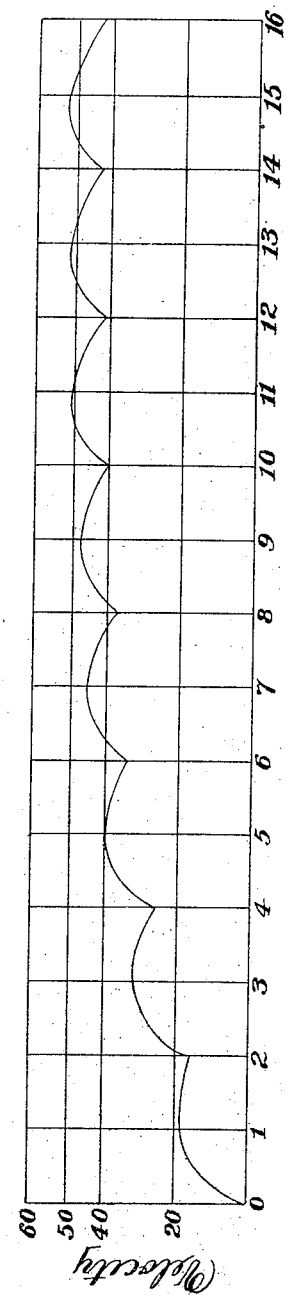

UNITED STATES PATENT OFFICE.

ARTHUR F. POOLE, OF KENILWORTH, ILLINOIS.

SPEEDOMETER.

1,249,189. Specification of Letters Patent. Patented Dec. 4, 1917.

Application filed September 18, 1915, Serial No. 51,402. Renewed April 23, 1917. Serial No. 164,027.

*To all whom it may concern:*

Be it known that I, ARTHUR F. POOLE, of Kenilworth, county of Cook, and State of Illinois, have invented certain new and useful Improvements in Speedometers, of which the following is a specification.

My invention is a speedometer, and is particularly adapted to use with automobiles. One of the objects of my invention is to provide a substitute for the flexible shaft usually used for connecting the running gear of the automobile with the speedometer head. Another object of my invention is the provision of improved pneumatic connecting means between the running gear and the speedometer head, and also in providing novel means for translating a series of the current impulses into continuous rotary motion. These and other objects of my invention will be hereinafter described and claimed.

My invention may be best understood by reference to the accompanying figures, of which:

Figure 1 is a sectional view somewhat diagrammatic of the speedometer head.

Fig. 2 is a diagrammatic view of the pneumatic actuating mechanism which connects the running gear of the automobile to the speedometer head.

Fig. 3 is a side view of the diaphragm at the transmitting end.

Fig. 4 is a modification of the speedometer proper.

Fig. 5 is a detail of parts of Fig. 1.

Figs. 6 and 7 are curves illustrating the way in which the velocity of the moving system changes with the time.

Referring to Fig. 2: 10 represents a gear which revolves at a rate proportional to the speed of the moving vehicle or other body whose speed it is desired to measure. Said gear is usually mounted on one of the front wheels of the automobile, but in case the speedometer is used for the determination of the speed of bodies other than automobiles, such for instance as the speed of rotation of a piece of machinery, the gear 10 is connected to such a body. Meshing with the gear 10 is another gear 11, on the face of which is a cam track 12. In this cam track travels a roller 13 mounted on a reciprocating bar 14, which is guided at one end by a fork 15, which straddles a shaft 16, on which the gear 11 is mounted. The other end of the bearing 14 is guided through a sliding bar 17, and is connected to a flexible diaphragm 18, which may be of leather or other suitable material. Rotation of the gear 11 will therefore cause the bar 14 to reciprocate and with it the diaphragm 18. This diaphragm serves as a cover for a chamber 19 having a vent 20 to which is attached a tube 21 communicating with the speedometer head, in which connected to said tube is chamber 22, which latter chamber, however, is of much smaller capacity than the chamber 19. A diaphragm 23 serves to close the chamber 22, and connected to this diaphragm is a reciprocating rod 24 guided in bearings 25 and 26, and on the end 29 of which are pivoted two links 27 and 28. A ratchet wheel 30, having a stud 31 mounted thereon, is rotatably mounted in the framework 42 of the speedometer head. On this stud 31 are pivoted a pair of arms 32, which are connected to the links 27 and 28 by the pivots 34 and 35. A pawl 36 is pivotally mounted on the arm 32 at 37, and is held in mesh with the ratchet wheel 30 by a spring 38. The arm 33 has similarly mounted on it at 39 a pawl 40, and a spring 41 tends to hold said pawl in contact with the ratchet 30.

From the preceding it will be apparent that revolution of the gear 10 will cause an oscillation of the rod 14, and that this oscillation, by reason of alternately compressing and exhausting the air contained in the chambers 19 and 22 and the connecting tube 21, will cause the rod 24 to oscillate in synchronism with it. Oscillation of this latter rod will produce, by reason of the oscillation of the arms 32 and 33, an intermittent rotation of the wheel 30, said wheel being advanced one tooth upon the compression stroke and another tooth upon the exhaust stroke of the rod 14.

Inspection of the cam 12 (Fig. 2) discloses that said cam is provided with a dwell at the end of the compression stroke and also at the end of the exhaust stroke, and that the acting surfaces of this cam are about one-third the angular length of the dead portions. This results in the wheel 30 being given a quick feeding motion and then a pause until the next succeeding motion of the rod 14.

From the above description of the connections between the front wheel of the automobile and the speedometer head proper, it is obvious that the flexible shaft is replaced by column of air contained in the two diaphragm chambers 19 and 22 and the tube 21 connecting the same. By providing the chamber 19 of much larger capacity than the chamber 22, leakage in the tube connecting these two chambers is rendered negligible, since there is always a larger volume of air expelled from or drawn into the chamber 19 than is necessary to work the diaphragm 23 associated with the chamber 22, therefore the rods 14 and 24 will move in unison.

I shall now describe the means by which the intermittent rotary motion of the wheel 30, which motion is proportional to the speed to be measured, is transformed into an approximately uniform motion, and this uniform motion is measured and transformed into the indications of a reciprocating hand. The ratchet wheel 30 is mounted in the framework 42 of the speedometer head by means of a ball bearing 43, and is connected by a helical spring 44 to a gear wheel 45 mounted on a shaft 46, which has one bearing in the ratchet wheel 30, and the other bearing 48 in the disk 49 supported rigidly in the framework 42. Mounted in the framework 42 by a ball bearing at 50 is a shaft 51 having a pinion 52 rigid therewith, and adapted to gear with the gear 45. Mounted on this shaft 51 is a flywheel 53 and also a conducting disk 54. A series of permanent magnets are mounted on the disk 49, and the disk 54 is placed so as to rotate between the poles of said magnets. As is well known, rotation of the disk 54 will induce eddy currents therein, and said rotation will be resisted with a force proportional to its velocity. The shaft 51 has its upper bearing in the disk 49, and mounted on the end of said shaft is a permanent magnet 56 having a bearing 57 therein which serves as a support of the lower end of a shaft 58, on which is mounted a conducting cup 59. A flange 60 made of magnetic material surrounds the cup 59, and serves to concentrate the lines of force of the poles of the magnet 56. The upper bearing of the shaft 58 is in the framework 42. At 61, on the end of the shaft 58, is mounted the indicating hand 62, which travels over a suitably graduated dial (not shown).

I shall now describe the operation of the indicating parts of the speedometer head. As before noted, the gear 30 is rotated intermittently at a rate which is proportional of the frequency of the impulses of the diaphragm 18, which latter of course is proportional to the speed to be measured. This intermittent rotation of the gear wheel 30 is transmitted by means of the spring 44, the gear wheel 45 and pinion 52 to the shaft 51. Owing to the fact that the rotation of the shaft 51 is resisted by the reaction of the conducting disk 54 and the permanent magnets 55, and also by the resistance of the flywheel 53 to a change in its velocity, the motion of the shaft 51 will be substantially uniform in spite of the intermittent nature of the impulses which drive it. The permanent magnet 56 rotates of course in unison with the shaft 51, and rotation of this permanent magnet tends to drag around with it the conducting cup 59 with a force that is proportional to the speed of rotation of said magnet. This force is resisted by a spring 63, one end of which is connected to the framework and the other end to the shaft 58. Since the force required to wind up the spring 63 is proportional to the angle to which said spring is wound, it is obvious that the hand 62 will be deflected to a position which is dependent on the speed of rotation of a magnet 56.

In order to provide against any undue vibration of the hand 62 I have provided a pinion 64 rigid on the shaft 58, and into this pinion is geared a wheel 65 mounted on a shaft rotatively mounted in the bracket 67 mounted on the disk 49. On the framework 42 is provided a damping chamber 68 having a cover 69 in which is the upper bearing of the shaft 66. Two vanes 70 and 71 are rigidly connected to the shaft 66, and are nearly the size of the chamber 68 in which they turn. This air damping device serves to further wipe out any irregularity in the motion of the hand 62 due to the fact of the motion of the shaft 51 being not exactly uniform, or due to any jar which may be given to the head as a whole.

It will be obvious that the average rate of rotation of the shaft 51 and its attached magnet 56 must be exactly the average rate of rotation of the ratchet wheel 30, and this equality of rotation will be maintained independent of any changes due to friction, or to the reaction of the permanent magnets 55 on the conducting disk 54. For if these two speeds were not exactly equal in the long run, the spring 44 would either be broken through being wound too tight in case the average rotation of the ratchet wheel 30 exceeded the shaft 51, or on the other hand would not be wound at all or wound in a negative direction, which would correspond to the rotations of the shaft 51 exceeding the rotations of the ratchet wheel 30.

While I have shown the indicating means consisting of the permanent magnet 56 and its associating conducting cup 59 as of the magnetic type, it is obvious that a speed indicating mechanism of some other type could be substituted therefor.

In Fig. 4 I have shown a modification of my device, in which the permanent magnets 56 and the conducting cup 59 are reversed. In this case a pair of permanent magnets 72 and 73 are mounted on the shaft which carries the hand, and instead of a permanent magnet being mounted on the shaft 51, a second conducting disk 74 is mounted thereon, and this disk, by means of the reaction between it and the permanent magnets 72 and 73 when said disk is rotated, causes a deflection of the shaft 58 and its associated hand 62.

Many modifications may be made in the precise form and arrangements herein shown without departing from the spirit of my invention. For instance, in case one wishes to put up with a certain irregularity of the hand 62, the ratchet wheel 30 and the spring 44 may be directly connected with the shaft 51. This may be done by mounting the ratchet gear 30 concentric with the shaft 51 and attaching the spring 44 directly to said shaft instead of to shaft 46 as shown in Fig. 1. Also by making the spring 44 sufficiently long, the system comprising the conducting disk 55 and its associated permanent magnets 54 may be dispensed with. However, when the ratchet wheel 30 is connected directly to the shaft 51 it is necessary that there be far more pneumatic impulses per mile, that is, the rod 14 must be reciprocated at a greater rate than is the case in the arrangement I have herein shown. I prefer to use a smaller number of impulses per mile for transmission and "gear up" in the speedometer head.

It is usual in speedometers to provide an odometer to record the distance traveled. I have not shown an odometer in this application, since the construction of the same is well known to those skilled in the art, and such a one would recognize that the odometer would be very readily geared to be actuated from either the gear 30 or the rotating shaft 51, since either of these parts makes a number of revolutions which is proportional to the distance traveled by the moving vehicle.

Having described the mechanical construction of my invention I shall now give the theory of it for the purpose of enabling those skilled in the art to determine the best proportions to give the various elements in order to construct a speedometer best fitted to the particular speed which is to be measured.

Let $I$ = the moment of inertia of the moving system which in the structure shown, will include the magnet 57, the disk 54, the fly wheel 53 and the gears 45 and 52.

Let $R$ = the counter-torque due to the permanent magnets and it is to be observed that this torque includes both the torque exerted on the disk 54 and also that exerted on the magnet 56 by the cup 59.

Let $T$ = the instantaneous torque of the spring 44 on the moving system.

Let $\phi$ = the variable angle of the disk.

Let $\omega$ = the angular velocity of the disk.
Let $t$ = the time.

The motion of the disk is determined by three torques, (1) the change of momentum $$I\frac{d^2\phi}{dt^2};$$

(2) the counter-torque of the magnetic field, which as above noted is proportional to the velocity of the disk and is equal to $$R\omega = R\frac{d\phi}{dt},$$

and third, the force of the spring which is proportional to the angle between the disk and the wound end of the spring $= K(\theta - \phi)$, where $K$ is the constant of the spring, $\theta$ is the angle of the lower end, and $\phi$ is that of the upper end.

Equating these torques $$I\frac{d^2\phi}{dt^2} + R\frac{d\phi}{dt} = K(\theta - \phi) \quad (1)$$

At this point it will be convenient to write $$2a = \frac{R}{I} \text{ and } b^2 = \frac{K}{I}$$

Substitute these values in equation (1) and rearrange the terms.

$$\frac{d^2\phi}{dt^2} + 2a\frac{d\phi}{dt} + b^2\phi = b^2\theta$$

It is to be noted at this point that the solution of this differential equation is the same as the solution of the equation of motion of a ballistic galvanometer or the equation of any body which is moving under the influence of an acceleration which varies directly as the displacement from the zero point and encounters a resistance which is proportional to the velocity.

The solution of this differential equation is well known and is in two parts, the particular integral, $\phi = \theta$, and the complementary function which is the solution of the left hand member equated to zero where $m_1$ and $m_2$ are the roots of the equation $$m^2 + 2am + b^2 = 0$$

from which $$m_1 = -a - \sqrt{a^2 - b^2}$$
$$m_2 = -a + \sqrt{a^2 - b^2}$$

The complete solution of the differential equation is therefore $$\phi = A\epsilon^{m_1 t} + B\epsilon^{m_2 t} + \theta$$

in which $\epsilon$ is the base of natural logarithms.

This solution may be exhibited in three forms corresponding to the following cases:

1. Where the roots $m_1$ and $m_2$ are both real and equal to each other. Then $$\phi = \epsilon^{mt}(A + Bt) + \theta$$

2. Where the roots $m_1$ and $m_2$ are real and not equal to each other in which case the equation takes the form $$\phi = Ae^{m_1 t} + Be^{m_2 t} + \theta$$

A and B being arbitrary constants to be determined from the initial condition.

3. In case the values $m_1$ and $m_2$ are imaginary, the arbitrary constants A and B become imaginary also and then by a proper substitution of the exponential values of the sine and cosine the equation may be transformed into $$\phi = Ae^{-at} \sin(bt + \alpha) + \theta$$

where A and $\alpha$ are integration constants determined from the initial conditions.

In Figs. 6 and 7 I have shown some curves computed on the assumption of concrete values for the constants R, K and I, assuming that the period of wind occurs once every two seconds and that the amount of wind is equal to one radian as referred to the shaft 51, these values being purely arbitrary and being assumed simply to illustrate the way in which the velocity of the moving system changes with the time. The curves were computed on the assumption that the system started rest and then the velocity at the end of two seconds was found, intermediate values being also computed to give the intermediate points on the curve. The equation for the velocity may be obtained by direct differentiation of the equation for $\phi$. At the end of two seconds the system had a certain velocity $\omega_0$ and had turned a certain angle $\phi_0$ from zero. Starting with these new values of the velocity and the angle new constants were determined for the differential equation and the change in velocity was computed for an additional period of two seconds. Continuing this process for about eight periods of two seconds each or that corresponding to a lapsed time of sixteen seconds gives the data from which the curve of Fig. 7 was drawn. Inspection of this figure shows that the velocity has become practically uniform, that is the velocity at the beginning of an epoch is the same as the velocity at the end of the epoch and this velocity starts in below the mean value and extends above it, then returns below the mean value again so that the average velocity is equal to the average velocity of the wound end of the spring.

The curve of Fig. 7 was computed according to the same method but with the constants R=9, K=2 and I=9.

In this case the departure from the mean velocity after things have reached a steady state is seen to be much less than with the constants shown in Fig. 6. This is to be expected since increasing the moment of inertia of the system will tend to smooth the ripples in the curve.

The coefficient of damping and the coefficient of the spring may be readily found in any given structure by disconnecting gears 45 and 52 and fastening the shaft 58 so that it will not turn in its bearing. The moving system mounted on the shaft 51 is then deflected through an angle and its time of vibration and amplitude of successive oscillations are noted. A weight of known moment of inertia is then placed on the axis 53, the system vibrated a second time and similar observations made. From these two observations the constants required may be readily determined, the formulas for so doing having already been worked out for similar constants in the case of determining the intensity of the earth's magnetic field by the method of vibrating a magnet therein.

I do not wish to be limited to the precise arrangement herein shown since I claim:

1. In combination a rotating member driven intermittently, a second member adapted to revolve against a resistance which varies as the velocity, and elastic means connecting the two members whereby the intermittently moving member drives the second one.

2. In combination a member adapted to be rotated, means for intermittently driving the same, a second member adapted to be rotated, a magnetic damping resistance and an elastic member connecting the said two members adapted to be rotated.

3. In combination a rotatable member, means for intermittently driving the same, a second rotatable member, a magnetic damping resistance operative on said second member and a spring connecting said two members.

4. In a speedometer the combination of means for obtaining a series of intermittent impulses proportional to the speed to be measured, a rotating member means to translate said impulses into an intermittent rotation of said member, a second rotating member, a magnetic damping for said second rotating member, a spring connecting said first and second rotating members.

5. In combination a rotatable member, means for intermittently rotating same, a second rotatable member, a magnetic damping resistance tending to prevent the rotation of said second member, a spring connecting the two said rotatable members, and means for measuring the speed of rotation of said second member.

6. In combination a rotatable member, means for intermittently rotating same, a second rotatable member, a magnetic damping resistance tending to prevent the rotation of said second member, a spring connecting the two said rotatable members, and magnetic means for measuring the speed of said second rotating member.

7. In combination a rotatable member, means for driving said member, step by step, means for translating the intermittent motion of said member in an approximately uniform motion of a second member and means to measure the speed of rotation of said second member.

8. In combination a rotatable member, means for driving said member, step by step, a second rotatable member, means for translating the intermittent motion of said first member into an approximately uniform motion of said second member and magnetic means to measure the rotation of said second member.

9. In combination a rotatable member, means for driving the same step by step, a conductor, a magnetic field, means to translate the step by step motion of said first member into an approximately uniform relative motion of said conductor and said magnetic field and means to measure the speed of relative moment between said conductor and said magnetic field.

10. In combination a rotatable member, means for intermittently driving the same, a magnet, magnetic means for translating said intermittent motion of the first member into an approximately uniform rotation of said magnet, an electric conductor adapted to be displaced by the rotating of said magnet and means for indicating the amount of said displacement.

11. In a speed indicating apparatus, means for producing a succession of intermittent impulses proportional to the speed to be measured, means for translating said impulses into a step by step motion of a rotatable body, means for translating said step by step motion into an approximately uniform motion of a magnetic field, a conductor adapted to be acted on by said magnetic field, a spring to hold said conductor in a normal position and means to indicate the displacement of said conductor from its normal position.

12. In a combination a rotatable electric conductor rotatable in a stationary magnetic field, a second magnetic field rotatable with said conductor, a second conductor adapted to be displaced by said second magnetic field and means to indicate the amount of displacement of said second conductor.

13. In a speed indicating apparatus, the combination of means to produce a series of pneumatic impulses varying as the speed to be measured, a rotatable member, means to translate said impulses into a step by step motion of said rotatable member, a second rotatable member, a magnetic resistance to govern the rotation of the same and an elastic connecting means between said first and second rotatable members.

14. In a speed indicating apparatus, the combination of means to produce a series of pneumatic impulses varying as the speed to be measured, a rotatable member, means to translate said impulses into a step by step motion of said rotatable member, a second rotatable member, a magnetic resistance to govern the rotation of the same, an elastic connecting means between said first and second members and means to measure the speed of rotation of said second rotatable member.

15. In a speed indicating apparatus, the combination of means to produce a series of pneumatic impulses varying as the speed to be measured, a rotatable member, means to translate said impulses into a step by step motion of said rotatable member, a second rotatable member, a magnetic resistance to govern the rotation of same, an elastic connecting means between said first and second members and magnetic means to indicate the speed of said second rotatable member.

16. In an automobile speedometer, the combination of means to produce a series of pneumatic impulses varying as the speed to be measured, said means to be located on the running gear of the automobile, a flexible tube connecting said means to a mechanism for translating said series of impulses into intermittent rotation of a revoluble member, a spring connecting said member to a second member, said second member being subject to a resistance varying as the speed of rotation of said member, and means to indicate the speed of said second member.

17. In an automobile speedometer, the combination of means to produce a series of pneumatic impulses varying as the speed to be measured, said means to be located on the running gear of the automobile, a flexible tube connecting said means to a mechanism for translating said series of impulses into intermittent rotation of a revoluble member, a spring connecting said member to a second member, said second member being subject to a resistance varying as the speed of rotation of said member, and magnetic means to indicate the speed of said second member.

In witness whereof I have hereunto signed my name this 17th day of Sept., 1915.

ARTHUR F. POOLE.

Copies of this patent may be obtained for five cents each, by addressing the "Commissioner of Patents, Washington, D. C."